United States Patent
Gudka et al.

(10) Patent No.: US 11,599,408 B2
(45) Date of Patent: *Mar. 7, 2023

(54) TECHNOLOGY SYSTEM AUTO-RECOVERY AND OPTIMALITY ENGINE AND TECHNIQUES

(71) Applicant: Capital One Services, LLC, McLean, VA (US)

(72) Inventors: Bhavik Gudka, McLean, VA (US); Surya Avirneni, McLean, VA (US); Eric Barnum, McLean, VA (US); Milind Patel, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/335,531

(22) Filed: Jun. 1, 2021

(65) Prior Publication Data

US 2021/0286668 A1    Sep. 16, 2021

Related U.S. Application Data

(63) Continuation of application No. 16/354,301, filed on Mar. 15, 2019, now Pat. No. 11,030,037, which is a
(Continued)

(51) Int. Cl.
*G06F 11/00* (2006.01)
*G06F 11/07* (2006.01)

(52) U.S. Cl.
CPC ........ *G06F 11/0793* (2013.01); *G06F 11/079* (2013.01); *G06F 11/0751* (2013.01); *G06F 11/0787* (2013.01)

(58) Field of Classification Search
CPC ............ G06F 11/0793; G06F 11/0751; G06F 11/0787; G06F 11/079; G06F 11/0709; G06F 11/0766; G06F 11/0781
See application file for complete search history.

(56) References Cited

U.S. PATENT DOCUMENTS 8,676,735 B1   3/2014  Heidenreich et al.
8,869,027 B2  10/2014  Louch
(Continued)

FOREIGN PATENT DOCUMENTS

SE    1750076 A1    8/2018

OTHER PUBLICATIONS

Non-Final Rejection for U.S. Appl. No. 17/555,718, dated Jan. 19, 2023, 8 Pages.

*Primary Examiner* — Joseph D Manoskey
(74) *Attorney, Agent, or Firm* — KDB Firm PLLC (57) ABSTRACT

Disclosed are hardware and techniques for correcting computer process faults by identifying risk associated with correcting a computer process fault and computer processes that may depend on the corrected computer process. The interdependent computer processes in a network may be determined by evaluating a stream of process break flags from a monitoring component coupled to the network. Each computer process break flag in the stream of computer process break flags indicates a process fault detected by the monitoring component and is correlated to a corrective response. The break flag and the corrective response are assigned a risk. A risk matrix accounts for interdependencies between computer processes and identified corrective actions. A final response strategy that corrects the computer process faults is determined using the assigned risk and computer system interdependence. A runbook stores the final response strategy, which may be updated based on changing computer process interdependencies and assigned risk.

20 Claims, 5 Drawing Sheets

Related U.S. Application Data continuation of application No. 16/201,471, filed on Nov. 27, 2018, now Pat. No. 10,282,248.

(56) References Cited

U.S. PATENT DOCUMENTS

| | | |
|---|---|---|
| 9,104,766 B2 | 8/2015 | Chan et al. |
| 9,178,960 B2 | 11/2015 | Abdelhadi et al. |
| 9,253,019 B1 | 2/2016 | Romanov et al. |
| 9,652,507 B2 | 5/2017 | Frankel et al. |
| 9,681,099 B1 | 6/2017 | Deets, Jr. |
| 9,742,651 B2 | 8/2017 | Agarwal et al. |
| 9,922,124 B2 | 3/2018 | Rathod |
| 9,939,994 B2 | 4/2018 | Ali |
| 10,165,447 B2 | 12/2018 | Raleigh et al. |
| 10,177,984 B2 | 1/2019 | Dagan et al. |
| 10,320,633 B1 | 6/2019 | Wong |
| 10,324,773 B2 | 6/2019 | Wing et al. |
| 10,326,642 B2 | 6/2019 | Markowitz et al. |
| 10,346,454 B2 | 7/2019 | Moeller-Bertram et al. |
| 10,354,208 B2 | 7/2019 | Jones |
| 10,373,090 B2 | 8/2019 | Holm et al. |
| 10,389,769 B2 | 8/2019 | Gudipaty et al. |
| 10,498,605 B2 | 12/2019 | Weith et al. |
| 10,620,948 B2 | 4/2020 | Brebner |
| 10,693,758 B2 | 6/2020 | Puri et al. |
| 10,721,239 B2 | 7/2020 | Koottayi et al. |
| 10,764,121 B2 | 9/2020 | Derakhshan et al. |
| 10,816,954 B2 * | 10/2020 | Mita ............... G05B 23/0278 |
| 10,824,528 B2 | 11/2020 | Gudka et al. |
| 10,839,320 B2 | 11/2020 | Augustine et al. |
| 10,862,777 B2 | 12/2020 | Richards |
| 10,862,931 B1 | 12/2020 | Jamison |
| 10,868,711 B2 | 12/2020 | Chor |
| 10,911,263 B2 | 2/2021 | Richards |
| 10,917,868 B2 | 2/2021 | Youn et al. |
| 10,936,458 B2 | 3/2021 | Gudka et al. |
| 10,938,634 B1 | 3/2021 | Cruise et al. |
| 10,942,946 B2 | 3/2021 | Oliner et al. |
| 10,956,508 B2 | 3/2021 | MacLean et al. |
| 10,974,611 B2 | 4/2021 | Kojima et al. |
| 11,003,421 B2 | 5/2021 | Bodin et al. |
| 11,226,919 B1 | 1/2022 | Austin |
| 11,232,117 B2 | 1/2022 | Mulder |
| 11,297,024 B1 | 4/2022 | Madan |
| 11,314,768 B2 | 4/2022 | Grewal |
| 2014/0373031 A1 * | 12/2014 | Ide ..................... G06F 9/542 |
| | | 719/318 |
| 2015/0271008 A1 * | 9/2015 | Jain ................. G06F 11/079 |
| | | 714/57 |
| 2015/0281322 A1 | 10/2015 | Dingwell |
| 2016/0034322 A1 | 2/2016 | Braudes et al. |
| 2016/0055026 A1 | 2/2016 | Fitzgerald |
| 2017/0010771 A1 | 1/2017 | Bernstein |
| 2017/0075719 A1 | 3/2017 | Scallan |
| 2017/0140387 A1 | 5/2017 | Nandi |
| 2017/0178034 A1 | 6/2017 | Skeen |
| 2017/0223046 A1 | 8/2017 | Singh |
| 2017/0366496 A1 | 12/2017 | Habermehl |
| 2018/0139086 A1 | 5/2018 | Chakraborty |
| 2018/0365628 A1 | 12/2018 | Bhaskaran |
| 2019/0089701 A1 | 3/2019 | Mercury |
| 2019/0190942 A1 | 6/2019 | Drummond |
| 2019/0265865 A1 | 8/2019 | Yaseen |
| 2019/0297126 A1 | 9/2019 | Graziano et al. |
| 2019/0391892 A1 | 12/2019 | Sabharwal et al. |
| 2019/0392310 A1 | 12/2019 | Sabharwal et al. |
| 2020/0042370 A1 * | 2/2020 | Kao ..................... G06K 9/6276 |
| 2020/0104401 A1 | 4/2020 | Burnett et al. |
| 2020/0160458 A1 | 5/2020 | Bodin |
| 2020/0167699 A1 | 5/2020 | Cohen |
| 2021/0021492 A1 | 1/2021 | Gao et al. |
| 2021/0029142 A1 | 1/2021 | Rajasekaran et al. |
| 2021/0176261 A1 | 6/2021 | Yavo |
| 2021/0191769 A1 | 6/2021 | Eschinger et al. |
| 2021/0406041 A1 | 12/2021 | Saraiya |
| 2022/0210168 A1 | 6/2022 | Yavo |

* cited by examiner

> CORRELATE THE RESPECTIVE INDIVIDUAL COMPUTER PROCESS BREAK FLAG CURRENTLY BEING EVALUATED TO KNOWN POSSIBLE CAUSES OF THE INDICATED PROCESS DEFICIENCY
> 251

> ASSIGN A BREAK EVENT RISK ASSESSMENT VALUE TO THE RESPECTIVE BREAK FLAG BASED ON THE RESPECTIVE BREAK FLAG'S CORRELATION TO THE KNOWN POSSIBLE CAUSES OF THE PROCESS DEFICIENCY INDICATED BY THE RESPECTIVE BREAK FLAG
> 253

> ACCESS THE DYNAMIC RUNBOOK CONTAINING KNOWN RESPONSES THAT CORRECT A NUMBER OF PROCESS FAULTS INDICATED BY THE RESPECTIVE BREAK FLAG BY CORRECTING ONE OR MORE OF THE KNOWN POSSIBLE CAUSES OF EACH PROCESS FAULT OF THE NUMBER OF THE PROCESS FAULTS
> 255

> IDENTIFY A LIST OF POSSIBLE RESPONSES FROM THE KNOWN RESPONSES CONTAINED IN THE DYNAMIC RUNBOOK THAT CORRECT ONE OR MORE OF THE KNOWN POSSIBLE CAUSES OF THE INDICATED PROCESS FAULTS
> 257

> DETERMINE AN INTERDEPENDENCY RATING THAT QUANTIFIES A LEVEL OF INTERDEPENDENCE OF EACH OF THE COMPUTER IMPLEMENTED PROCESSES THAT MAY BE AFFECTED BY APPLICATION OF EACH OF THE POSSIBLE RESPONSES IN THE LIST OF POSSIBLE RESPONSES
> 259

> ASSIGN A FIX EVENT RISK ASSESSMENT VALUE TO EACH OF THE POSSIBLE RESPONSES IN THE LIST OF POSSIBLE RESPONSES
> 260

TECHNOLOGY SYSTEM AUTO-RECOVERY AND OPTIMALITY ENGINE AND TECHNIQUES

RELATED APPLICATIONS

This application is a continuation of U.S. patent application Ser. No. 16/354,301, filed Mar. 15, 2019, which is a continuation of U.S. patent application Ser. No. 16/201,471, filed Nov. 27, 2018, both titled "TECHNOLOGY SYSTEM AUTO-RECOVERY AND OPTIMALITY ENGINE AND TECHNIQUES". The contents of the aforementioned applications are incorporated herein by reference in their entirety.

BACKGROUND

Current state of technology remediation is that, when computer process, computer hardware or software breaks, people gather resources and execute fail safes and contingency plans to recover the broken technology (i.e., the broken computer process, computer hardware or software). Workarounds and typical break-fix activities are the mainstays of technology remediation and make up the best practices for how to recover technological services when something goes awry. The aim of these recovery plans is address three metrics commonly used to indicate the efficacy of a technology remediation system: mean time to detect (MTTD); mean time to repair (MTTR); and mean time between failures (MTBF). An effective technology remediation system implements processes that reduce MTTD and MTTR, while increasing the MTBF.

There are several commercial systems with offerings, such as Zabbix that allow a computer system "break-fix" to be paired with a "Response." These commercial offerings, however, tend to require specific break events to trigger a single response. The evolution of technology services (e.g., computer systems that implement services and applications) means that the technological environments, technology, and their frameworks are becoming increasingly complex. Moreover, the identification of any single "root causing break event" may be complicated by cloud-based services such as Amazon web services (AWS), Microsoft Azure, Oracle Cloud, Apache Hadoop, or Google Cloud platform, cross connections with physical hardware-based networks, and the many development frameworks and different coding languages that make up even simple applications. Presently, the determination of where a root-cause source of a technology problem is substantially an all-human experience driven, and humans are slow providers of "production system support" and "incident triage."

As a result, different types of production system support methodologies have been implemented to compensate for the human shortfalls. Across tech organizations, production system support functions use manually-generated and manually-maintained document libraries, called Runbooks, that are used to identify a problem via integrated monitoring and deploy a fix. These production system support functions are siloed to specific applications that have such documentation.

For example, one production system support process may be termed "Fix on the go." In a fix on the go process, engineers may make weekly/monthly rotations to support issues for 24 hours, 7 days a week. In response to detection of an application-specific issue, a support team member pages one of the engineers in the "on call" group. The engineer on call will access via a graphical user interface an incident bridge that lists issues, attempt to understand the issue and implement a fix using an emergency change process. This is a slow labor-intensive process and does not help reduce MTTR.

Another production support process utilizes document-based (where a "document" can be an actual document, on online file, help system or some other reference source) operational runbooks that a development team/support team documents steps to fix known/recurring issues. The document operational runbooks save some time but are not a significant improvement as an engineer needs to understand the procedure during an issue and implement the steps of fixing the known/recurring issues. There is always a chance of human error with either the understanding of the procedure or the implementation of the steps fixing the known/recurring issues. Related production support processes that automate the runbook (keep the scripts on some server/repo) offer slight improvement, but these processes still rely on a human to find a cause and trigger a fix from the corresponding runbook.

Some automated systems rely heavily on operator expertise to correctly identify the problem, its solution, and deploy it as quickly as possible. When expertise, understanding of the broken system, and/or ability execute the fix are lacking, the brokenness escalates throughout a computing system and begins to impact upstream and downstream systems as well. This chain of up and downstream systems is called "interdependency."

Time is of the essence in nearly all remediation instances, but without proper resources, technology systems are subjected to lengthy and investigative triage. The fix is typically done in a silo of the impacted system first, which places the interdependencies at risk of ongoing impact and delay in restoration of service. This siloed focus on a single break event complicates root cause in the interdependent system chain and can lead to false positives where any single failure is fixed, but a root cause remains unaddressed in a systemically broken set of technology services.

The evolution of cloud-based services further complicates the technology remediation solutions as a common solution is to continually create new instances (where an instance can be the cloud equivalent to any application or network service entity) and destroy the older instances of the less robust services or applications before an issue arises "just in case."

Interdependent systems further complicate break-fix stability. As system complexity increases, the definition of "working" and "broken" get blurred as does the visibility of past break-fix events as they correlate to any present events. The interdependency of systems further reduces an engineer's ability to completely understand the effects of a fix to one system on another system when the applied fix affects multiple processes of the other system.

It would be beneficial if a system or process was available that identified the optimal "fix" to a process break that accounted for interdependencies between systems and processes.

SUMMARY

Disclosed is an example of an apparatus including a memory and a triage processing component. The memory may store programming code, and the triage processing component may be coupled to the memory and, via a communication interface, to a monitoring component. The monitoring component monitors operation of computer implemented processes of a network. The triage processing component when executing the stored programming code performs functions to receive, from the monitoring component, a first process break event indicating a symptom of a potential operational breakdown of one or more computer implemented processes. The received first process break event is evaluated for correlations to possible causes of the potential operational breakdown of the computer process. Based on the correlation to the possible cause of the potential operational breakdown of the computer process, a list of possible corrective actions that can be implemented to fix the one or more computer implemented processes to prevent the potential operational breakdown may be identified. The triage processing component may assign a break risk assessment value indicating a likelihood of occurrence of the potential operational breakdown of the computer implemented process. A respective fix risk assessment value to each of the identified possible corrective actions may be assigned. A risk assessment matrix may be populated with the assigned break risk assessment value and the fix risk assessment value assigned to each of the identified corrective actions. The risk assessment matrix may contain elements representing the computer implemented process, a number of other computer implemented processes, and an interdependency rating that quantifies a level of interdependence of each of the other computer implemented processes on the computer implemented process. The triage processing component may access a runbook. The runbook may include a number of corrective actions that correct potential operational breakdowns of computer implemented processes of the network. A list of corrective actions correlated to the first process break event may be obtained from the runbook. The list of corrective actions may be modified based on a rule set applied to the risk matrix. The modified list of corrective actions may include at least one of the identified possible corrective actions as an optimal corrective action.

An example of a method is also disclosed. The method example includes receiving, by a triage processing circuit coupled to a number of monitoring circuits and a network environment, a stream of computer process break flags from one or more of the plurality of monitoring circuits coupled to the network environment. Each computer process break flag in the stream of computer process break flags indicating a process fault of a computer implemented process detected by the respective one or more monitoring circuits that generated the received computer process break flag. A dynamic runbook containing fixes known to correct known process faults based on each process break flag in the stream of computer process break flags may be generated. Individual computer process break flags may be extracting from the received computer process break flag stream. Each individual computer process break flag extracted from the computer process break flag stream may be evaluated by correlating a respective individual computer process break flag currently being evaluated to known possible causes of the indicated process fault. A break event risk assessment value may be assigned to the respective break flag based on the respective break flag's correlation to the known possible causes of the process fault indicated by the respective computer process break flag.

A dynamic runbook may be accessed. The dynamic runbook may contain known responses that correct a number of known process faults indicated by the respective break flag by correcting one or more of the known possible causes of the number of known process faults. A list of possible responses from the known responses contained in the dynamic runbook may be identified. The known process responses in the list of possible responses corrects at least one of the known possible causes of the indicated process faults. An interdependency rating of each of the possible response in the list of possible responses may be determined. The interdependency rating quantifies a level of interdependence of each of the computer implemented processes that may be affected by application of each of the possible responses in the list of possible responses to the network. A fix event risk assessment value is assigned to each of the responses in the list of possible responses. As each respective individual computer process break flag is evaluated, a risk matrix may be populated to include the break risk assessment value of an evaluated individual computer process break flag, each fix risk assessment value assigned to each of the possible responses, and the interdependency rating of each possible response in the list of possible responses. The risk matrix may be assessed to generate a preliminary response strategy to be implemented to correct the process fault indicated by each individual computer process break flag that has been evaluated in the stream of computer process break flags. The preliminary response strategy may identify a response that corrects the computer process faults indicated by one or more of the evaluated computer process break flags. The generated preliminary response strategy may be reevaluated. The preliminary response strategy may be modified based on the results of the reevaluation. The modified preliminary response strategy may be modified until the modified preliminary response strategy remains unchanged after multiple evaluations of individual computer process break flags from the received stream of computer process break flags and multiple assessments of the risk matrix. In response to no further modifications being performed on the generated preliminary response strategy after multiple reevaluations, a final response strategy is generated. The final response strategy identifies a response that when applied to a computer implemented process corrects a computer process fault indicated by the evaluated computer process break flags. The response identified in the final response strategy may be applied to the computer implemented process in the network environment.

Also, disclosed is a non-transitory computer-readable storage medium storing computer-readable program code executable by a processor. The execution of the computer-readable program code by the processor causes the processor to receive, via a coupling to one or more monitoring circuits coupled to a system environment, a number of computer process break flags from the one or more monitoring circuits. Each of the number of computer process break flags indicates a process fault in the system environment. A break event risk assessment value is generated indicating a risk of an occurrence of a computer process break attributable to the process fault indicated by each of the respective computer process break flags. For each respective computer process break flag a correlation to one or more possible root causes of the process fault indicated by each of the respective computer process break flags is determined. For each correlated one or more possible root causes of the process fault indicated by the respective computer process break flag, a known fix for each correlated possible root cause of the process fault indicated by the respective computer process break flag may be identified. A respective risk, for each identified known fix, of each identified known fix adversely affecting other computer processes in the system environment may be determined. A fix event risk assessment value is assigned to each identified known fix. A risk assessment matrix is generated with the assigned break risk assessment value and the fix risk assessment value assigned for each of the known fixes. A runbook may be modified based on a rule set applied to the risk matrix. The runbook is a list of procedures for implementing the known fixes of the indicated process fault to the one or more computer implemented processes associated with at least one of the respective process break flags.

DETAILED DESCRIPTION

Various embodiments are generally directed to techniques to evaluate the computer process status in a network environment based on interdependencies of the computer processes and identify a response that corrects root causes of any process faults. Embodiments include an auto-recovery and optimality engine that may be an apparatus that utilizes a rules engine that may be configured to account for interdependencies between large numbers (e.g., thousands) of computer applications in an enterprise and an even larger number (e.g., tens of thousands) of application programming interfaces (API) that operate throughout an enterprise network environment. For example, the rules engine can run on its own and learn as more data is processed. The rules engine may learn more about the computer application or API interdependencies using statistical learning or machine learning and become self-optimizing based on the learning. The rules engine may assist in the determination of correlations between the Break and Fix Events, using the determined correlations generate a scoring matrix (containing elements related to different system attributes, such as a Risk attribute, a Security Threat attribute, or other attributes) such that a "Best Fix" can by dynamically matched to the indicated breakages for automatic or human-reviewed deployment. A break event may be an indication of nearly anything that goes awry with a process, such as a failure.

The following examples illustrate the improvements in the technology auto-recovery and remediation services provided by the disclosed processes, apparatus and systems. For example, the disclosed subject matter enables the classification of the break event by risk event so that correction, referred to herein as a "fix", "corrective action", or "response", of the break can be linked to the most appropriate response, fix or corrective action. The improvement to the technology auto-recovery and remediation services may be measured by commonly-used industry terms, such as mean time to detect issues (MTTD), mean time to repair (MTTR) and mean time between failures (MTBF) that are achieved by associating a risk of correction while addressing the correction of any root causes of indicated process faults. The fix, corrective action, or response may not completely "correct" the computer process but may simply correct performance of the computer process such that no monitoring component indicates a break event. In other words, the computer process is not exceeding any thresholds or guardrails.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

Figure 1:
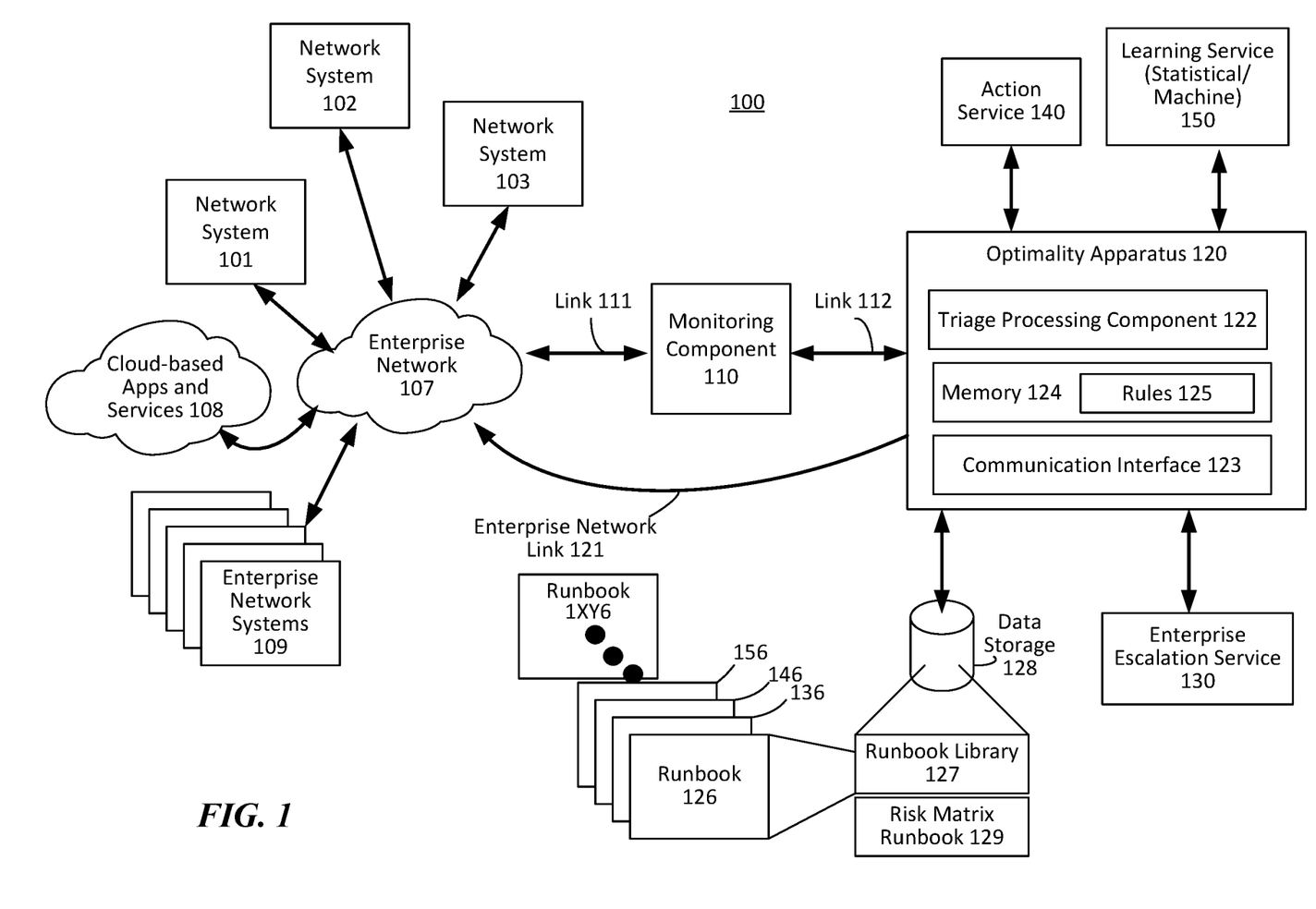
FIG. 1 illustrates a network environment example of a computer process optimality system implementation.

FIG. 1 illustrates an example of a system including an implementation of a computer process optimality apparatus implemented in a network environment.

The system 100 may include an enterprise network 107 to which are coupled various system components, such as network systems 101, 102, 103 and enterprise network systems 109, and cloud-based computer applications (i.e., apps) and services 108. The respective network systems 101, 102, 103 and enterprise network systems 109 may include computer processes and/or additional computing system environments that provide or support operations of the enterprise. The functioning, which includes the operation at runtime, performance and other attributes that are observable during operation of the network systems 101-103, the enterprise network systems 109 and the cloud-based apps and services 108 may be monitored by the monitor component 110 via link 111 to the enterprise network 107. The monitoring component 110 may include one or more computer process monitoring software or systems, such as those provided by Pagerduty, Zabbix, Datadog, Apica systems or the like.

The monitoring component 110 may assist with log management, application performance management (APM), system monitoring and web monitoring as well as ticketing tools or deployment tools. Alert fatigue, missed events incorrect responder or increased resolution. The monitoring tools may monitor the network, servers, enterprise cloud performance, application performance, and service performance. For example, the tools may monitor server performance, server availability, and server configuration changes. Aspects of server performance that may be monitored may include high processor or memory usage, packet loss, interface errors, low core router throughput, abnormal normal TCP connections, or network bandwidth usage.

Returning to the example of FIG. 1, each of the one more computer processing monitoring software or systems of the monitoring component 110 may output a break event indicating a symptom of a potential operational breakdown of one or more computer-implemented processes that are being monitored. A break event may be a flag or other data string output by the respective computer process monitoring software or system.

The monitoring component 110 may be coupled to an optimality apparatus 120. The optimality apparatus 120 may be coupled to an enterprise escalation service 130, a data storage 128, an action service 140 and a learning service 150. The enterprise escalation service 130 may be called when a fix event risk assessment value exceeds a predetermined threshold value, and human intervention may take place to decide how to proceed with remediating a process fault. The action service 140 may be called based on an indication in the risk matrix that automated correction is available and human intervention is unnecessary.

The optimality apparatus 120 may also be configured to evaluate past performance to optimize responses and evaluation by the triage processing component. For example, after performing the example processes and function described with reference to FIG. 1 and in the following examples, the optimality apparatus 120 may have computer process status information from before the monitoring component 110 output a break event or a stream of break events (described in the following examples), during the time the optimality apparatus 120 was evaluating the break events and fix events, or responses, and post-correction of a break event root cause. The rules 125 may be used to determine which break events matter to system performance and health, and increasingly correlate those break events to fix events that most effectively correct the break events.

The optimality apparatus 120 may also be referred to as auto-recovery and optimality engine, and may utilize a rules engine (configured in hardware, firmware, software or a combination of each) that may be configured to account for interdependencies between thousands of computer applications in an enterprise and tens of thousands of application programming interfaces (API) that operate throughout an enterprise network environment. The rules engine can run on its own and learn from itself, it may use statistical learning or machine learning to self-optimize. The optimality apparatus 120 may execute a rules engine to assist in the determination of correlations between the Break and Fix Events, generation of a scoring matrix (containing elements related to different system attributes, such as a Risk attribute, a Security Threat attribute, or other attributes) using the determined correlations, and determining an optimal fix to the indicated breakages.

The optimality apparatus 120 may include triage processing component 122, memory 124, and a communication interface 123. The triage processing component 122 be coupled to the memory 124 and via the communication interface 123 may couple with the monitoring component 110, the data storage 128, the enterprise escalation service 130, the action service 140 and the learning service 150. In some examples, the optimality apparatus 120 may be a processing system that implemented using one or more servers or computing devices that are interconnected via one or more network links, e.g., wired, wireless, fiber, or the like.

In the example of FIG. 1, the triage processing component 122 may be one or more processors that include one or more processing cores that process information and data. Moreover, the triage processing component 122 may include one or more processing devices, such as a microprocessor manufactured by Intel™, AMD™, or any of various processors.

The memory 124 may include one or more memory (volatile or non-volatile) devices configured to store instructions used by the triage processing component 122 to perform one or more operations consistent with the disclosed examples. For example, memory 124 may be configured with one or more software instructions, such as computer readable program code that can perform one or more operations when executed by the triage processing component 122. Of course, the disclosed program code is not limited to separate programs or computers configured to perform dedicated tasks. For example, memory 124 can include a single program that performs the disclosed operations or could include multiple programs.

Memory 124 can also store data that can reflect any type of information in any format that the system can use to perform operations consistent with the disclosed examples. For example, the memory 124 may store rules 125. The rules 125 may be applied as described in the disclosed examples to received break events and identified fix events to produce optimal corrective action procedures. The triage processing component 122 may access the rules 125 in memory 124 and execute a rules engine that performs the functions as described in more detail below and with reference to other examples.

In the example, the optimality apparatus 120 may couple to a data storage 128. The data storage 128 may include hard disk drives, flash memory devices, optical storage devices, floppy storage devices, and the like. In some instances, the data storage 128 may include cloud-based storage devices that may be accessed via the communication interface 123. In some examples, the data storage 128 may be configured to store one or more databases and/or as a distributed database system to store information and data. An example of the one or more databases may be a runbook library 127. The runbook library 127 may include several different runbooks 126-1XY6 specific to each of the network systems 101-103, the cloud-based apps and services 108, and the enterprise network systems 109. Each of the network systems 101-103, the cloud-based apps, and services 108, and the enterprise network systems 109 has a runbook for the respective computer processes within each respective system. Each runbook 126-1XY6 in the runbook library 127 is a list of procedures for implementing possible corrective actions to the one or more computer-implemented processes. For example, network system 101 may have hundreds of computer processes executing, and each computer process may have a runbook with a list of procedures for implementing fixes, or corrective actions, to fix root causes of actual or potential operational breakdowns of the one or more computer-implemented processes. The runbooks 126-1XY6 stored in the runbook library 127 may be relatively static with only intermittent or periodic updating.

In addition to the runbook library 127, the data storage 128 may also store a risk matrix runbook 129. A risk matrix runbook 129 may be a runbook that is dynamically updated via functions provided by the optimality apparatus 120. For example, the risk matrix runbook 129 may be updated based on evaluations of the elements within a risk matrix. The risk matrix runbook 129 may include a list of procedures for correcting root causes of actual or potential operational breakdowns in all the network systems 101-103, enterprise network systems 109, and the cloud-based apps and services 108. The risk matrix runbook 129 may be an aggregation of all the runbooks in the runbook library 127 and may be considered a dynamic runbook. The risk matrix runbook 129 may include an optimal corrective action or fix for any break event indication output by the monitoring component 110 regardless of the network system 101-103, 109 or cloud-based app and service 108 that generated the break event indication. An optimal corrective action or fix is a fix that corrects the root cause of the break event indication with minimal effects on other computer processes within the same network system and with minimal effects on computer processes in any other network systems. The risk matrix used to generate the risk matrix runbook 129 may an evolution of the rules 125 that begins on Day 1 and continues indefinitely as the engine is self-optimized and automation brings in an ever-greater library of runbooks.

The communication interface 123 includes one or more digital and/or analog communication devices that allow the triage processing component 122 to communicate with other machines and devices, such as the monitoring component 110 via a link 112 and the enterprise network via enterprise network link 121. The communication interface 123 may be configured to communicate via any type of connection, e.g., wired, wireless, optical, or the like. These communication interface 123 may include network adapters and/or modems to communicate with the enterprise network 107 and monitoring component 110.

The learning service 150 may be a computer-implemented service that utilizes one or more learning models, such as a statistical or machine learning model, from the actions taken by the optimality apparatus 120 to optimize corrective actions and procedures for applying the corrective actions to the enterprise network systems 101-103, 109 and the cloud-based apps and services 108.

It may be helpful to explain frequently used terminology, such as break event and fix event, break risk assessment value, fix risk assessment value, a process fault, a process attribute, a process break, and the like. For example, a break event may be output by a monitoring system as an indication of nearly anything that goes awry with a process, such as a failure to connect to a service, failure to receive an input within a prescribed time or after multiple requests, regularly exceeding time limits for completing tasks, memory allocation errors or limit problems or the like. An example of a process fault may be a potential operational breakdown or functional breakdown but may also be an issue with a non-functional process requirement or process attributes, such as process stability, process security, process usability, process performance, process response time, resilience, or the like. For example, process stability in the network environment may be one process attribute that the optimality apparatus may control or respond to changes of, the attribute or attributes the optimality apparatus may control or respond to changes of may be Operability or Usability, or any other non-functional attribute such as these. For example, operability may be the ability to keep a system or equipment within the system operating reliably and safely. While usability may, for example, be considered an extent to which the operating application or system may be used to achieve quantifiable levels of utility, improved user experience, and user satisfaction. A process break may be a failure or shutdown of the computer process.

Non-functional process attributes may also be referred to as qualities, quality goals, quality of service requirements, constraints, non-behavioral requirements, or technical requirements. Non-functional attributes may describe how a system is supposed to be. Conversely, functional requirements may describe what a system is supposed to do.

As a monitoring system, such as the monitoring component described with reference to FIG. 1 monitors the computer processes, some of the computer processes may begin to degrade or fail. For example, at a certain point as the computer process begins to degrade, a potential operational breakdown of one or more computer implemented processes may be detected by the monitoring circuit and a break event is output indicates a guardrail, or threshold, has been exceeded and the process status, state or health goes from "working" to "failing." For most organizations, this definition is some measure of a quantitative metric, like latency or some other term in a service level agreement, for example, that is time or alerts within a timeframe based. This line between "working" and "failing" is a critical time in the performance of the system since most computer processes within the network environment are interdependent on other computer processes within the network environment. When a failure begins, there is an exponential risk that up/downstream systems begin to break as well.

A monitoring system may have threshold settings, or guardrails, against which the monitoring circuit compares a measurement of a process attribute being monitored to a number of different thresholds or guardrails, such as an ALERT, which means that the computer process is experiencing a fault but is still working with an acceptable performance level, or FAILING, which means performance is no longer working at an acceptable performance level. In response to a measurement related to a computer process exceeding a guardrail, the monitoring circuit may generate a break event. The break event may be indicative of an ALERT or FAILING performance measurement. As the monitoring circuit continues to monitor the process that caused the initiation of the break event, the monitoring circuit may continue to compare the measurement of the process attribute to see if, yet another guardrail is exceeded. Each of the respective guardrails may indicate an increased severity, or urgency, the computer process's status with respect to potential failure, breakdown or another operational fault. In contrast to a break event, a fix event is an indication, a flag or even an address of corrective action that will correct a process experiencing a break event, or fix the cause of the break event, multiple unrelated break events (e.g., restart system) or multiple related break events.

A break risk assessment value may be a value indicating a probability that a computer for which a break event has issued will break. For example, the assigned break event risk assessment value ranges from a value indicating the operational breakdown has a high likelihood of occurring to a value indicating the operation breakdown has a low likelihood of occurring. The fix event risk assessment may be a value indicating a probability that a computer for which a break event has issued will be fixed or corrected by an identified corrective action or fix. For example, the respective fix event risk assessment value assigned to each of the identified possible corrective actions, or known fixes, may have a range from a value indicating the operational breakdown has a high likelihood of being fixed to a value indicating the operation breakdown has a low likelihood of being fixed by the respective identified possible corrective action. In some examples, a high likelihood may be greater than 50 percent, greater than 60 percent or greater than 85 percent while a low likelihood may be less than 50 percent, less than 40 percent or less than 5 percent. The respective percentages may vary between systems and computer processes.

In addition, the examples described in detail below refer to a risk matrix. A risk matrix may, for example, include elements and input from all the systems in the network environment including the network systems, cloud-based apps and service and enterprise network. The risk matrix may be populated with break events, break risk assessment values, fix events, fix risk assessment values, and evaluated based on interdependencies of the systems' responses to the respective break events, break risk assessment values, fix events, fix risk assessment values in the risk matrix.

It may be helpful to briefly describe an operational example in the context of a single break event with reference to FIG. 1. In the example, the optimality apparatus 120 may receive, from the monitoring component 110, a first process break event indicating a symptom of a potential operational breakdown of one or more computer-implemented processes occurring in any of network system 101-103, one of the enterprise network systems 109 or one of the cloud-based apps and services 108. Upon receipt of the first process break event, the triage processing component 122 may access the runbooks in the runbook library 127 and utilize the rules 125 to evaluate the received first process break event to determine correlations to possible causes of the potential operational breakdown. Based on the determined correlations between the first process break event and respective possible causes of the potential operational breakdowns, the triage processing component 122 may identify a list of possible corrective actions that can be implemented to fix the one or more computer-implemented processes to prevent the potential operational breakdown. The triage processing component 122 may assign a break risk assessment value indicating a likelihood of occurrence of the potential operational breakdown of the one or more computer-implemented processes and assign a respective fix risk assessment value to each of the identified possible corrective actions in the list of possible corrective actions. The assigned break risk assessment value and the fix risk assessment value assigned for each of the identified corrective actions may be used to populate a risk assessment matrix. For example, the risk assessment matrix has elements representing a plurality of computer-implemented processes including the one or more computer-implemented processes and an element for an interdependency rating that quantifies a level of interdependence of each of the plurality of computer-implemented processes. The interdependency rating may be determined by an analysis of the expected health of other processes based on an application of the identified corrective action to the computer process that caused the generation of the break event. The triage processing component 129 may access a runbook, such as 126, in the runbook library 127, and using a set of rules in the rules 125 that are applied to the risk matrix, may modify the list of procedures in the runbook, such as 126.

The optimality apparatus 120 may receive from the monitoring component 110 an additional process break event. The additional process break event may indicate an additional symptom of another or the same potential operational breakdown of one or more computer-implemented processes. The triage processing component 122 may evaluate the additional process break as discussed above. For example, the triage processing component 122 may update correlations to possible causes of the potential operational breakdown of the one or more computer implemented processes by analyzing the received additional process break event in conjunction with the first process break event. Based on the updated correlations, the triage processing component may update the list of possible corrective actions. In response to updating the list of possible corrective actions, the triage processing component 122 may generate updated break risk assessment values for the potential operational breakdown of the one or more computer-implemented processes as well as generating updated fix event risk assessment values for each corrective action in the updated list of possible corrective actions.

In an example, the optimality apparatus 120 may also be configured to evaluate past performance to optimize responses and evaluation by the triage processing component. For example, after performing the example processes and function described with reference to FIG. 1 and in the following examples, the optimality apparatus 120 may have computer process status information from before the monitoring component 110 output a break event or a stream of break events (described in the following examples), during the time the optimality apparatus 120 was evaluating the break events and fix events, or responses, and post-correction of a break event root cause. The rules 125 may be used to determine which break events matter to system performance and health, and increasingly correlate those break events to fix events that most effectively correct the break events.

In another example, the optimality apparatus 120 may receive subsequent process break events from one or more of the multiple monitoring circuits of the monitoring component 110. The triage processing component 122 may generate, based on the received subsequent break events, break risk assessment values and fix risk assessment values. The generated break risk assessment values and fix risk assessment values may be used as additional elements to populate the risk assessment matrix. The triage processing component 122 by performing evaluations (which are described in more detail with reference to FIGS. 2A and 2B) may identify one procedure in list of procedures for implementing one corrective action to fix the potential operational breakdowns indicated by the subsequent break events. The runbook, such as a risk matrix runbook 129 or the relevant runbook (e.g., 136) or runbooks (e.g., 126-156) in the runbook library 127 may be modified to include the identified one procedure as the procedure to implement when the potential operational breakdown indicated by the subsequent break events requires fixing.

Figure 2A:
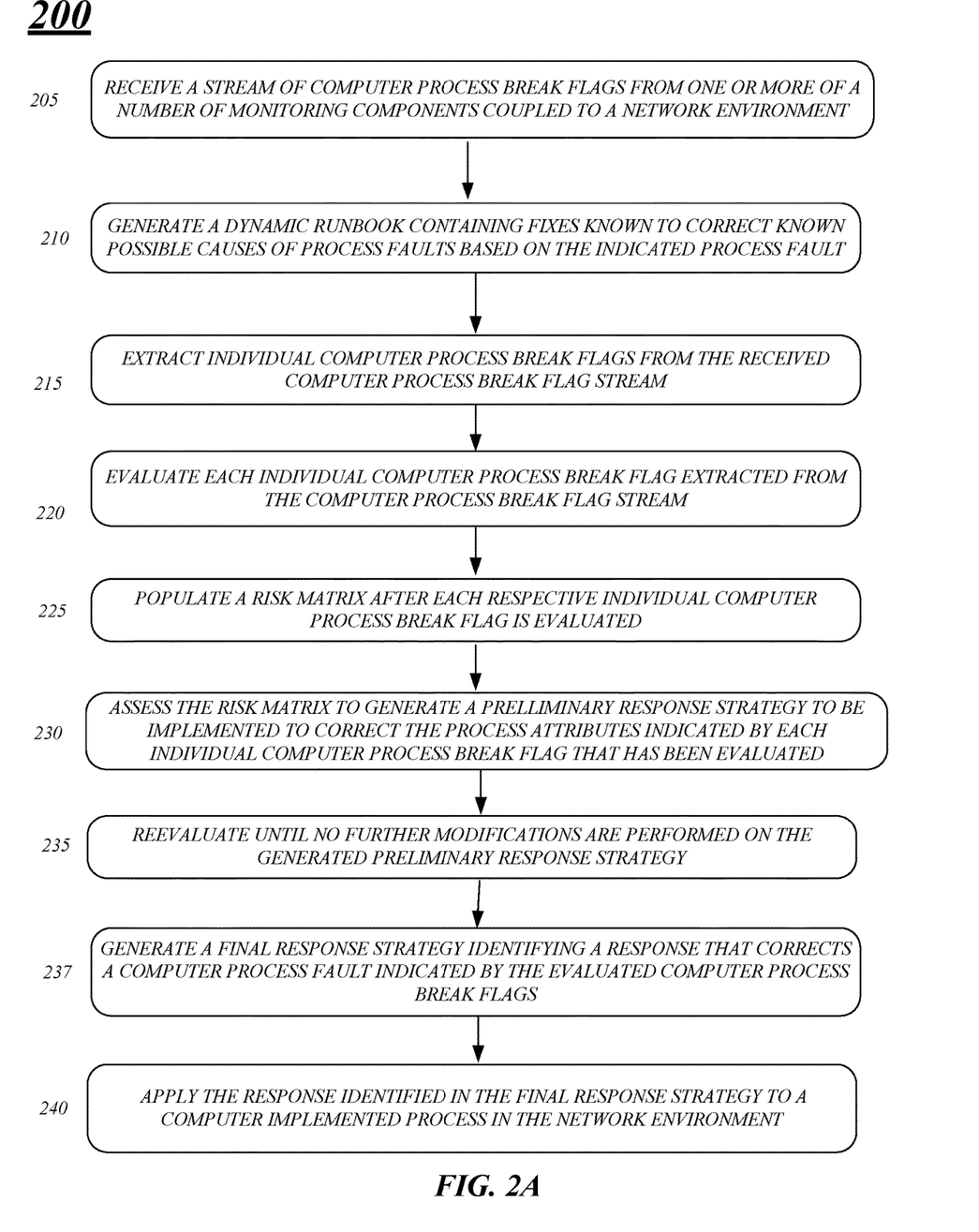
FIG. 2A illustrates an example process performed by an optimality system for determining an optimal remedial action to correct a computer process deficiency.

The foregoing example referred to processing individual break events, but a stream of break events may also be received by the optimality apparatus 120. A more detailed operational example describing the receipt of a stream of break events is provided with reference to FIG. 2A. FIG. 2A illustrates an example process performed by an auto-recovery system for determining an optimal remedial action to correct a computer process deficiency.

The process 200 of FIG. 2A may be executed by a system comprising an optimality apparatus (such as 120 of FIG. 1), a number of monitoring circuits (such as monitoring component 110 of FIG. 1), and a network environment (such as 107 of FIG. 1). The optimality apparatus may be coupled to the number of monitoring circuits and the network environment. The optimality apparatus may include triage processing component such as 122 of FIG. 1. At 205 of the process 200, the triage processing component may receive a stream of computer process break flags from one or more of the plurality of monitoring circuits coupled to the network environment.

The stream of computer process break flags, also referred to herein as break events may include revised computer process break flags of the same computer process but may also include new computer break event flags. The new computer process break flags may be generated in response to a new computer process deficiency detected by the monitoring component. Each computer implemented process may be assigned a guardrail threshold value by the triage processing component. For example, a monitored computer process that previously exceeded a first guardrail threshold may exceed a subsequent guardrail threshold causing an updated break event flag to be generated indicating the process attribute that caused the subsequent guardrail to be exceeded. Computer processes may be monitored, and the monitoring component may generate a measurement based on the operation of the computer process. For example, the monitoring component may include a number of monitoring circuits that monitor a status of multiple computer-implemented processes of the network environment, the multiple computer-implemented processes being interdependent upon one another for operation, such as stable, optimal or some other non-functional requirement, of the network environment. Each monitored computer process may have an assigned threshold value that based on a comparison to the measurement may cause a computer process break flag to be generated. The monitoring techniques and the processes for generating computer process break flags or break events are known. Therefore, a more detailed discussion of the computer process monitoring techniques and the generation of the computer process break flags or break events is omitted for the sake of convenience.

For example, the stream of break events as explained above may include a break event from process ZBA (which may be one of thousands of computer processes) of network system 101 of FIG. 1, a break event from process ABC of network system of 103, and so on as the monitoring component determines that a break event is to be generated from any of the processes being monitored. Each computer process break flag in the stream of computer process break flags may indicate a process fault detected by the respective one or more monitoring circuits that generated the received computer process break flag.

As the computer process break flags are received either in a stream or individually, the computer process break flags may be processed to determine for each respective computer process break flag a correlation to one or more possible root causes of the process fault indicated by each of the respective computer process break flags. The correlated possible root causes may be further processed as explained in more detail below.

At 210, a dynamic runbook may be generated by the triage processing component. The generated dynamic runbook may contain fixes known to correct known process volatility based on the indicated process attribute. The individual computer process break flags are extracted (215) by the triage processing component from the received computer process break flag stream. For example, the break flags may be one or more bits in length or the like, that enables the break flag stream to be parsed by a computer processor. Each individual computer process break flag extracted from the computer process break flag stream may be evaluated at 220.

As each respective individual computer process break flag received in the stream is evaluated, a risk matrix may be populated (225). Elements of risk matrix may be populated with the break risk assessment value of an evaluated individual computer process break flag. The risk matrix grows as the number of unique break events (unique meaning both unique in the process indicated by the break event and any new break events generated. The risk matrix may also be populated with each fix risk assessment value assigned to each of the possible responses and the known responses including each possible response in the list of possible responses.

The risk matrix is assessed (230) to generate a preliminary response strategy to be implemented to correct the process fault indicated by each individual computer process break flag that has been evaluated in the stream of computer process break flags. The preliminary response strategy may identify a response that corrects the computer process faults indicated by one or more of the evaluated computer process break flags. As the stream of break events is evaluated, the preliminary response strategy may continue to be updated based on the results of the subsequent evaluations (i.e., reevaluations). In some examples, the identified interdependencies may be used in the generation of the final response strategy. As the interdependencies are evaluated, the generated final response strategy may be updated based on the identified interdependency risk patterns.

The triage processing component continues receiving a stream of break events from the monitoring component and reevaluates (235) the break events as described above with respect to step 220 and steps 225 and 230 until the generated preliminary response strategy remains unchanged after multiple evaluations, or reevaluations, of individual computer process break flags extracted from the received stream of computer process break flags and multiple assessments of the risk matrix. The generated preliminary response strategy may be modified based on results of the reevaluation. In response to no further modifications being performed on the generated preliminary response strategy after multiple reevaluations, a final response strategy may be generated (237). The final response strategy may identify a response that corrects a computer process fault indicated by the evaluated computer process break flags.

At 240, the response identified in the final response strategy is applied to a computer-implemented process in the network environment. In some examples, prior to applying the response identified of the response strategy to the network environment, the dynamic runbook may be modified to include the generated final response strategy.

Additionally, a next iteration of the risk matrix may be monitored to determine an impact of the applied final response strategy on interdependent computer implemented processes.

Figure 2B:
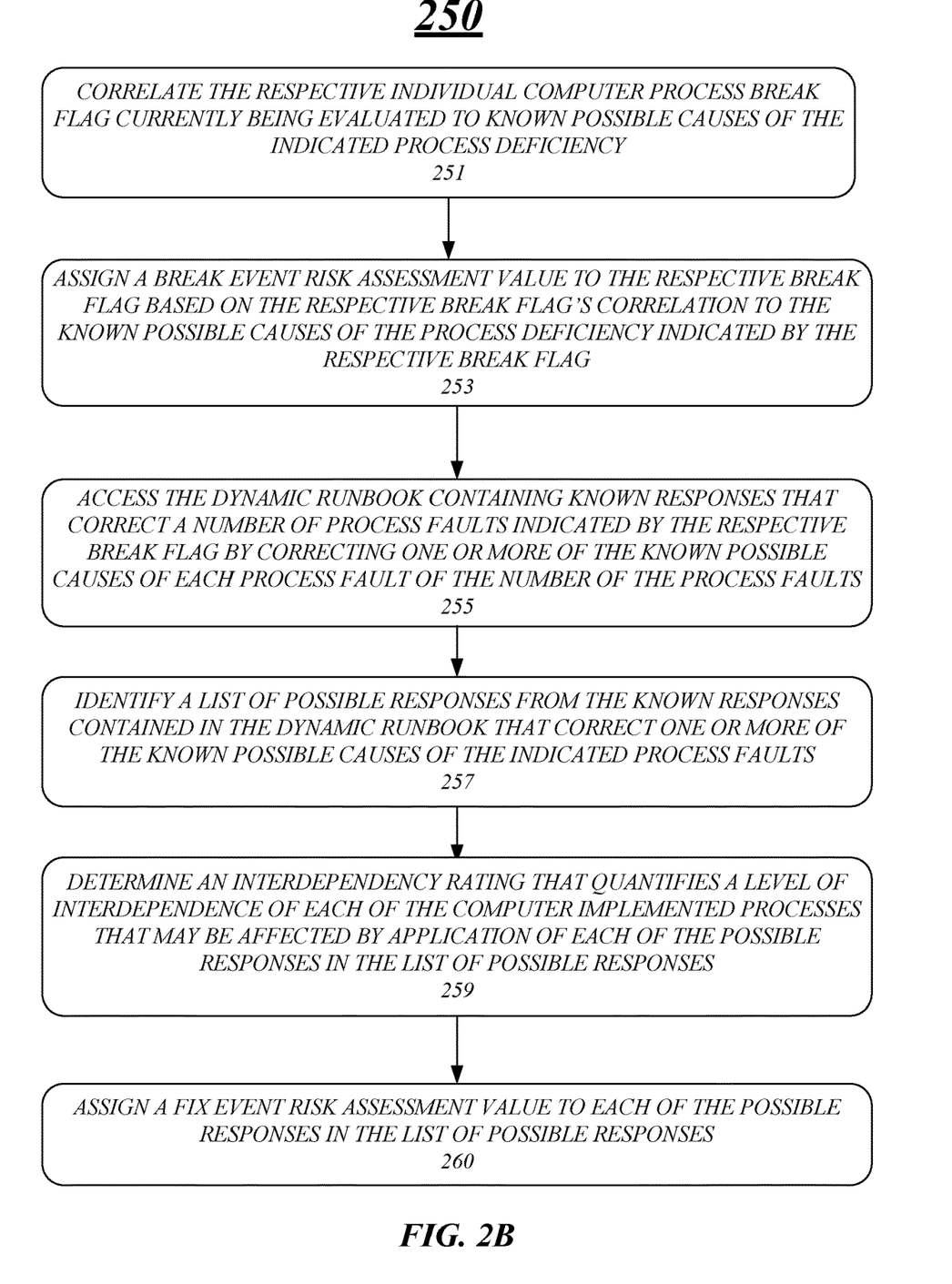
FIG. 2B illustrates an example sub process performed by an optimality system when performing one or more processes described with respect to the example of FIG. 2A.

The evaluation of a respective individual computer process break flag as described above with reference to FIG. 2B may include subprocesses. Examples of the subprocess may include a subprocess described with reference to FIG. 2B. FIG. 2B illustrates an example subprocess performed by an auto-recovery system when performing one or more processes described with respect to the example of FIG. 2A.

In FIG. 2B, the example subprocess 250 of the evaluation of the respective individual computer process break flag at step 220 of FIG. 1 may include correlating, at 251, the respective individual computer process break flag that is currently being evaluated to known possible causes of the process attribute indicated by the respective process break. All, or substantially all, computer process break flags in the received stream of computer process break flags including the respective computer process break flag is assigned a break event risk assessment value at 253. For example, an optimality apparatus, such as 120 in FIG. 1, may generate or assign a break event risk assessment value. The break event risk assessment value may, for example, indicate a risk of an occurrence of a computer process break attributable to the process fault indicated by each of the respective computer process break flags. In an example, the assigned break event risk assessment value, which may be a number of bits in length, assigned to each break event risk assessment may range from a value indicating the process fault has a high likelihood of causing a process break to a value indicating the process fault has a low likelihood of causing a process break (i.e. complete failure or shutdown). The assigned break event risk assessment value may, for example, be based on the respective break flag's correlation to the known possible causes of the process attribute indicated by the respective break flag.

The optimality apparatus may access (255) the dynamic runbook, such as the runbook developed based on the risk matrix or another runbook stored in a memory or data storage, such as 124 or 128. The dynamic runbook may contain known responses that correct several known process faults indicated by the process attribute by correcting one or more of the known possible causes of the number of known process faults.

At 257, a list of possible responses may be identified from the known responses contained in the dynamic runbook that correct one or more of the known possible causes of the indicated process faults. Individual responses in the list of possible responses may be identified based on a correlation between the respective computer process break flag and one or more possible root causes. In an example, for each correlated one or more possible root causes of the process fault indicated by the respective computer process break flag, a known fix may be identified for each correlated possible root cause of the process fault indicated by the respective computer process break flag. In some examples, the identified response in the generated final response strategy may be an ordered series of multiple responses that are applied serially to the network environment. For example, the order of the multiple responses in the ordered series may be according to a respective fix risk assessment value of each response of the multiple responses in the final response strategy. In an example, the ordered series of multiple responses may be applied, as in step 240 of FIG. 2A, serially to the network environment.

Interdependent systems complicate break-fix stability and other network quality attributes. As network and system complexity increases, the definition of a process "working" and being "broken" may get blurred as does the visibility of past break-fix events as they correlate to any present event. It should be noted that system or process performance may degrade but the system or process may still have a status of "working." In some examples, the risk matrix populated with the assigned break event risk assessment value and the fix event risk assessment value assigned for each of the identified corrective actions may be evaluated by identifying interdependency risk patterns in the risk matrix. For example, the identified interdependency risk patterns may indicate risks related to responses in the runbook and effects of implementing response on respective computer-implemented processes in the network environment. For example, network system 101 may never break but may continually be risk scored because it is dependent on another system, such as network system 102. Over time, the rules 125 may determine via evaluation of a risk matrix that network system 101 is strongly correlated to and is mostly likely impacted by the breaking (i.e., process health or performance) of network systems 102, 103 and enterprise network systems 109, and their respective fix events such as A1, A2, and A3. However, network system 101 may never correlate to any of the break events or fix events. By evaluating the risk matrix, patterns such as the interdependence of network system 101 on the process health status of network systems 102, 103 and enterprise network systems 109, and their respective fix events such as A1, A2, and A3 become more apparent. Based on the recognition of the pattern resulting from the interdependence, the rules 125 may be updated and a final response strategy may be developed for inclusion in a runbook for the effected network systems.

The risk patterns may be analyzed with respect to rules, such as rules 125 in FIG. 1 by the optimality apparatus, to determine an interdependency rating, e.g., a value ranging from 1-100, 0.00 to 1.00, 100-1000 or the like, that quantifies a level of interdependence of each computer-implemented process on one another in the network that may be affected by application of each of the possible responses in the list of possible responses.

At 259, an interdependency rating may be determined for each of the computer-implemented processes that may be affected by the application of each of the possible responses in the list of possible responses.

Upon determining an interdependency rating, a fix event risk assessment value may be assigned, at 260, to each possible response in the list of possible responses. In an example, the fix event risk assessment value assigned to each respective possible response may be several bits in length and may range from a value indicating the process fault has a high likelihood of being corrected by the respective possible response to a value indicating the process fault has a low likelihood of being corrected by the respective possible response.

The example of FIG. 2B is but one example of a subprocess for evaluating the individual computer process break flags extracted from the stream of break flags. Of course, other subprocesses may be used to make the evaluation.

In another example described with reference to FIG. 1 above, the optimality apparatus 120 may be configured to execute programming code stored on a non-transient computer-readable medium. Processing component, such as 122 in the optimality apparatus 120 described with reference to FIG. 1, and as also described in a later example may execute the programming code. Upon executing the programming code, the processing component may perform additional functions, such as simulations of break events to enhance response and to continue to identify optimal corrective actions and to test the application of simulated corrective actions to computer processes identify unintended consequences to other computer processes that may have an unapparent interdependency on the computer process to which the simulated corrective action.

The results of the simulations may enable further updates to the runbooks 126-1XY6 of the runbook library 127 and to the risk matrix runbook 129. For example, the optimality apparatus 120 may produce a simulation copy of the generated risk assessment matrix and simulation copy of the modified run book, both of which may be stored in data storage as part of the risk matrix runbook 129, the runbook library 127 or in a separate location of the data storage 128. Simulated process breaks may be obtained by the optimality apparatus 120 as received process break events. Break risk assessment values and fix risk assessment values of the successive break events determine based on the simulated process break events. The copy of the generated risk assessment matrix may be populated by the optimality apparatus 120 using the determined break risk assessment values and fix risk assessment values to produce a revised risk assessment matrix. The triage processing component 122 of the optimality apparatus 120 may, for example, compare break risk assessment values and fix risk assessment values of the simulated process break events in the simulation copy of generated risk assessment matrix to break risk assessment values and fix risk assessment values of the simulated process break events in the revised risk assessment matrix.

Based on the results of the comparison, the simulation copy of the modified runbook may be revised to identify one procedure in the list of procedures for implementing the one corrective action to fix the potential operational breakdown. Using statistical analysis, the revised simulation copy of the modified runbook may be evaluated against the simulation copy of the modified runbook to determine whether the revised simulation runbook copy includes the identified one procedure as the procedure to implement when the potential operational breakdown requires fixing. If the identified procedure is included in the revision to the modified runbook, no further action is taken, and the simulation results may be implemented in the runbooks in the runbook library or the risk matrix runbook.

Figure 3:
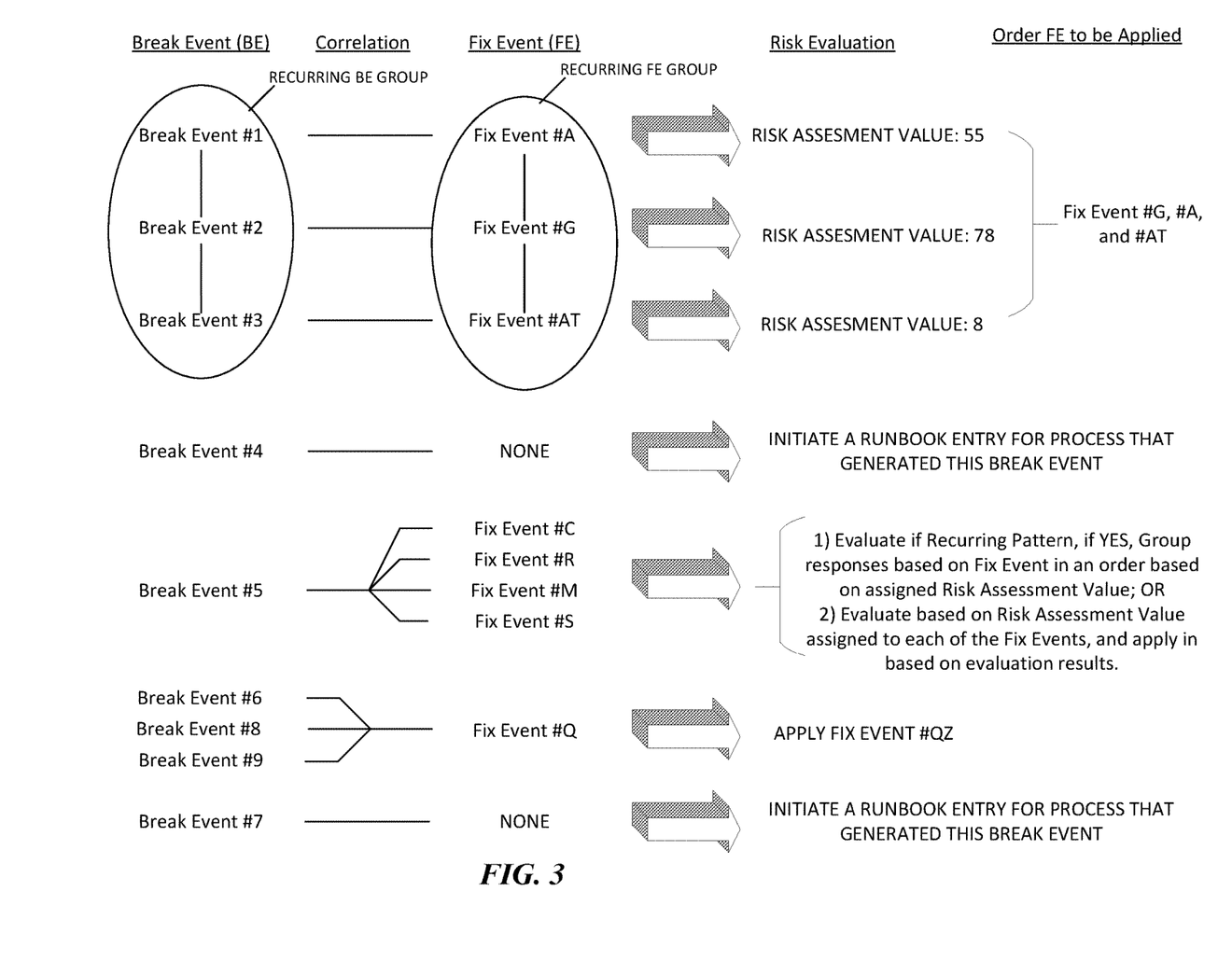
FIG. 3 is a graphic for discussion of an example of a process of correlating a break event to a fix event and determining an optimal fix event.

FIG. 3 is a graphic illustrating an example of a process of correlating a break event to a fix event and determining an optimal response. In the example of FIG. 3, a break event flag may be viewed as a symptom of the computer process break event that may correlate to many possible causes. In the dynamic runbook, some of the many possible causes of the break events may be listed and as a result, fixes to the causes of the break events may be identified. For example, multiple different break events may correlate to multiple different fix events. Or, as shown in FIG. 3, Break Event #5 correlates to four different fix events, Fix Events #C, #R, #M and #S, other break events may correlate to a single fix, such as Break Events #1, #2 and #3. In another alternative, multiple break events may correlate to a single fix event, such as Break Events #6, #8 and #9 may correlate to Fix Event #Q. However, some break events may not correlate to any fix events, such as, for example, Break Events #4 and #7. In cases such as Break Events #4 and #7 that have no correlation to any fix events, a runbook entry specific to the respective break events and the computer processes that caused the generation of the respective break events may be made in an existing runbook, a new runbook that is initiated, or in the runbook based on the risk matrix.

For example, any given runbook's risk matrix scoring contains fix events that indicated a corrective action or response that corrects many of the root causes behind the generation of a break event. As the risk matrix for any given runbook is updated by the addition of more information determined from the received stream of break events, the number of possible root causes of the break events begins to decrease, and the number of fix events correlating to the diminishing number of break events also begins to decrease. The list of fix events or final responses in the final response strategy may be updated to reflect the decreases in the number of break events and the number of fix events. The fix event risk assessment value may be used to further narrow the diminishing number of fix events to a single fix event or perhaps, two or three fix events. In the case in which a single response, or fix event is determined as a final response strategy by evaluating, via the risk matrix, the interdependencies of all systems in the network, the fix event risk assessment value of the single response may be reviewed to confirm the fix event risk assessment value is below a gatekeeping threshold (e.g., very low risk or minimal risk). Upon successful confirmation, the optimality apparatus, if so configured, may apply the single response without any human intervention or approval.

For example, the risk matrix runbook may include many fix events that correlate to a few different break events, or vice versa. In the example of FIG. 3 with respect to Break Event #5, several fix events may correlate to the respective break events. Upon determining several fix events may correlate to the respective break events, the optimality apparatus may evaluate the risk matrix to determine if the several fix events are a recurring pattern of fix events that correlate to the break event. If the determination is "YES, it is a recurring pattern of fix events," the order of the application of the respective fix events may be determined based on the respective fix event risk assessment value assigned to the respective fix event (as explained in further with reference to Break Events #1, #2 and #3). If the determination is "NO", the optimality apparatus may further analyze the respective fix event risk assessment value assigned to each correlated fix event and determine which of the correlated fix events may be applied, and the order of application if more than one fix event is determined to be applied to correct the cause of the break event.

In another example illustrated in FIG. 3, break events, such Break Events #1, #2, and #3, may correlate to a single, respective fix event, such as Fix Event #A, #G and #AT, respectively. The optimality apparatus may upon an evaluation using past and present values in the risk matrix determine that the occurrence of Break Events #1, #2, and #3 or the correlation to Fix Events #A, #G and #AT is a recurring pattern, or patterns. If the evaluation results in a determination of recurring pattern, the optimality apparatus may initialize a final response strategy that includes multiple fix events, or responses. For example, the optimality apparatus may be configured to address the situation by grouping break events with the correlated fix events. In the example, Break Events #1, #2, and #3 may be identified as a recurring group of break events. Similarly, the respective Fix Events #A, #G and #AT may be referred to as a recurring group of fix events. For example:

Break Event #1 may be corrected by application of Fix Event #A to the network computer process associated with Break Event #1, Fix Event #A has an assigned fix event risk assessment value of 55.

Break Event #2 may be corrected by application of Fix Event #G to the network computer process associated with Break Event #2, Fix Event #G has an assigned fix event risk assessment value of 78.

Break Event #3 may be corrected by application of Fix Event #AT to the network computer process associated with Break Event #3, Fix Event #AT has an assigned fix event risk assessment value of 8.

In this example, the Break Events #1, #2 and #3 may be determined to be a recurring pattern, the respective responses or corrective actions indicated by fix events #A, #G and #AT may be applied as a single corrective action. An order of the application of the respective corrective actions that make up the single corrective action may be determined using the fix event risk assessment value assigned to the respective Fix Event (FE). For example, the fix event risk assessment value may be used to prioritize the order of application of the respective fix event, or response. As shown in FIG. 3, based on the risk assessment values being highest to lowest, e.g., 78, 55 and 8, the order for application of the respective fix events that corrects Break Events #1, #2 and #3 is Fix Event #G, #A, and then #AT.

The runbook may include a few fix events that correlate to many different break events. In the example of FIG. 3, Break Events #6, #8 and #9 correlated to Fix Event #QZ. In this case, the optimality apparatus may apply the corrective action of Fix Event #QZ to the computer-implemented processes that caused the generation of Break Events #6, #8 and #9.

As described with respect to FIGS. 2A and 2B above, the risk matrix is assessed to generate a final response strategy, and if upon the revaluation of the final response strategy, the above pattern of break events #1, #2, and #3 is determined to be a recurrent pattern. In such a case, when break events #1, #2 and #3 occur together, the three break events may be #1, #2 and #3 grouped or clustered as a single break event #1, #2, #3. In response to the generation of the single break event #1, #2, #3, the optimality apparatus may modify or update the final response strategy to cluster Fix Events #G, #A, #AT into a single Fix Event #G, A, AT for application when break event #1, 2, 3 is detected. In this way, break event #1, #2, #3 has a 1:1 correlation with fix event #G, A, AT.

Additional details and examples may be found in contemporaneously filed U.S. patent application Ser. No. 16/201,660, entitled TECHNIQUES AND SYSTEM FOR OPTIMIZATION DRIVEN BY DYNAMIC RESILIENCE, the entire contents of which are incorporated by reference.

Figure 4:
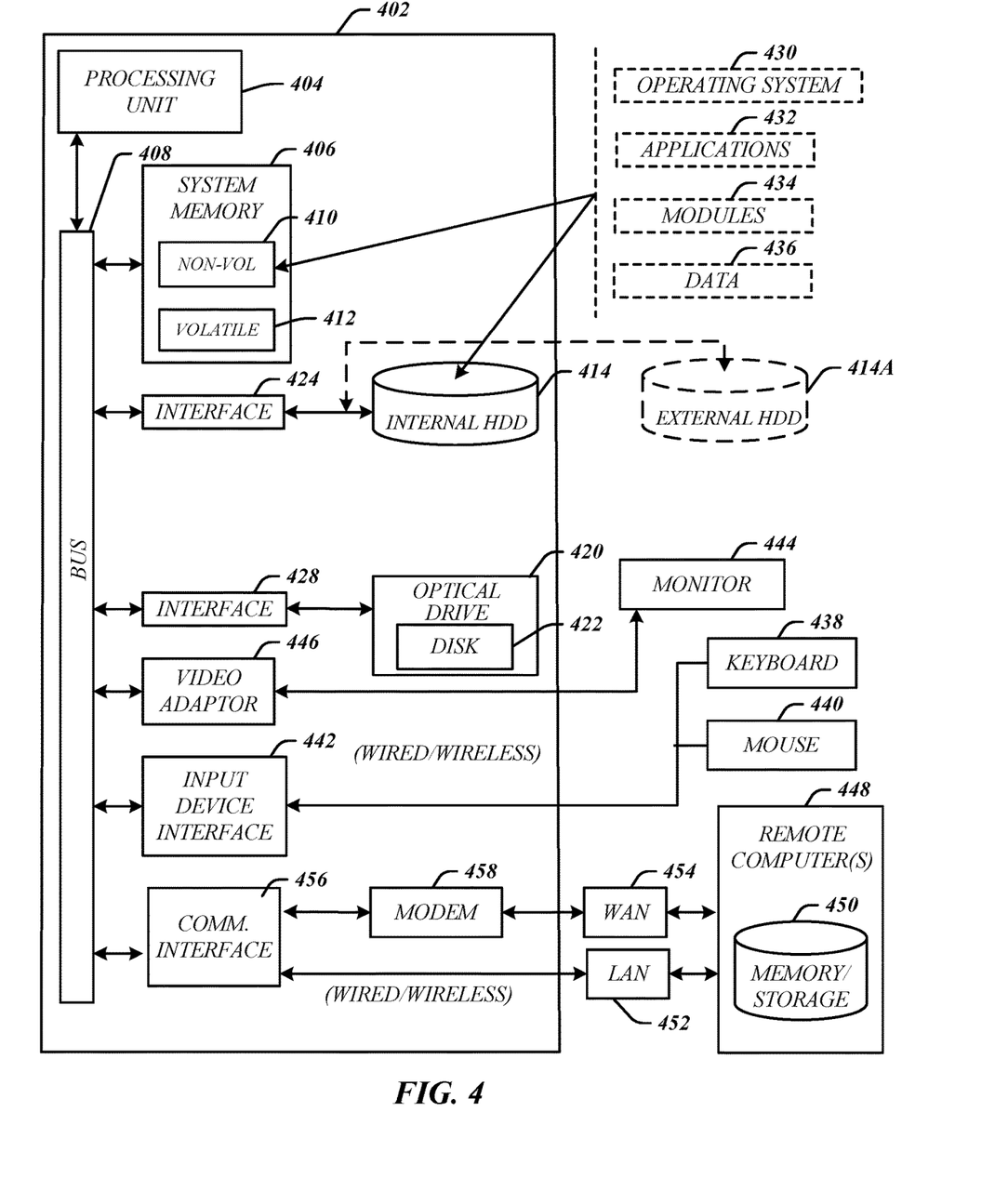
FIG. 4 illustrates an embodiment of an exemplary computing architecture suitable for implementing the devices and systems described with respect to FIGS. 1-2B.

FIG. 4 illustrates an embodiment of an exemplary computing architecture 400 suitable for implementing various embodiments as previously described. In one example, the computing architecture 400 may include or be implemented as part of system 100. In another example, the computer architecture 400 includes components of an optimality apparatus as well as other components that may optionally be part of the optimality apparatus.

As used in this application, the terms "system" and "component" are intended to refer to a computer-related entity, either hardware, a combination of hardware and software, software, or software in execution, examples of which are provided by the exemplary computing architecture 400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server or a processor and the server or the processor can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 400 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 400.

As shown in FIG. 4, the computing architecture 400 includes a processing unit 304, a system memory 406 and a system bus 408. The processing unit 404 can be any of various commercially available processors. The optimality apparatus 120 of FIG. 1 may incorporate one or more of the components of the computer architecture 400, such as the processing unit 404, the system memory 406 and so on. Other components, such as the keyboard 438 and the mouse 440, may be omitted in some examples.

The system bus 408 provides an interface for system components including, but not limited to, the system memory 406 to the processing unit 404. The system bus 408 can be any of several types of bus structure that may further interconnect to a memory bus (with or without a memory controller), a peripheral bus, and a local bus using any of a variety of commercially available bus architectures. Interface adapters may connect to the system bus 408 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 400 may include or implement various articles of manufacture. An article of manufacture may include a non-transient computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 4, the system memory 406 can include non-volatile memory 410 and/or volatile memory 412. A basic input/output system (BIOS) can be stored in the non-volatile memory 410.

The computer 402 may include various types of computer-readable storage media in the form of one or more lower speed memory units, including an internal (or external) hard disk drive (HDD) 414 or 414A, and an optical disk drive 420 to read from or write to a removable optical disk 422 (e.g., a CD-ROM or DVD). The HDD 414 and optical disk drive 420 can be connected to the system bus 408 by an HDD interface 424 and an optical drive interface 428, respectively. The HDD interface 424 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 410, 412, including an operating system 430, one or more application programs 432, other program modules 434, and program data 436. In one embodiment, the one or more application programs 432, other program modules 434, and program data 436 can include, for example, the various applications and/or components of the system 400.

A user can enter commands and information into the computer 402 through one or more wire/wireless input devices, for example, a keyboard 438 and a pointing device, such as a mouse 440. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 404 through an input device interface 442 that is coupled to the system bus 408 but can be connected by other interfaces such as a parallel port, IEEE 1394 serial port, a game port, a USB port, an IR interface, and so forth.

A monitor 444 or another type of display device is also connected to the system bus 408 via an interface, such as a video adaptor 446. The monitor 444 may be internal or external to the computer 402. In addition to monitor 444, a computer typically includes other peripheral output devices, such as speakers, printers, and so forth.

The computer 402 may operate in a networked environment using logical connections via wire and/or wireless communications to one or more remote computers, such as a remote computer 448. The remote computer 448 can be a workstation, a server computer, a router, a personal computer, portable computer, microprocessor-based entertainment appliance, a peer device or other common network node, and typically includes many or all the elements described relative to the computer 402, although, for purposes of brevity, only a memory/storage device 450 is illustrated. The logical connections depicted include wire/wireless connectivity to a local area network (LAN) 452 and/or larger networks, for example, a wide area network (WAN) 454. Such LAN and WAN networking environments are commonplace in offices and companies and facilitate enterprise-wide computer networks, such as intranets, all of which may connect to a global communications network, for example, the Internet.

For example, an auto-recovery and optimality engine implemented according to the example of FIG. 4 may identify, through the risk matrix, any pathway or pattern that leads to a single root cause for a break event that can be automatically fixed or corrected. As described in the examples of FIGS. 1-3, the application of risk is an improvement because the use of risk in the risk matrix enables the identification of more than one break event that correlates to an indicated single fix event or final response, enables the auto-recovery and optimality engine to invoke a user gateway, using, for example, a computer application stored in applications 432 memory 406 or any one of the internal HDD 414 or external HDD 414A, usable to implements the hardware and process examples described with reference to FIGS. 1-3 above.

When used in a LAN networking environment, the computer 402 is connected to the LAN 452 through a wire and/or wireless communication interface 456. The communication interface 456 can facilitate wire and/or wireless communications to the LAN 452, which may also include a wireless access point disposed thereon for communicating with the wireless functionality of the communication interface 456.

When used in a WAN networking environment, the computer 402 can include a modem 458, or is connected to a communications server on the WAN 454 or has other means for establishing communications over the WAN 454, such as by way of the Internet. The modem 458, which can be internal or external and a wire and/or wireless device, connects to the system bus 408 via the input device interface 442. In a networked environment, program modules depicted relative to the computer 402, or portions thereof, can be stored in the remote memory/storage device 450. It will be appreciated that the network connections shown are exemplary and other means of establishing a communications link between the computers can be used.

The computer 402 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices, apparatuses or systems as previously described with reference to FIGS. 1-4 may include various hardware elements, software elements, or a combination of both. Examples of hardware elements may include structural members, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

However, whether an embodiment is implemented using hardware elements, cloud elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

What is claimed is:

1. An apparatus, comprising:
a memory storing programming code; and
a triage processing component, coupled to the memory and, via a communication interface, to a monitoring component that monitors operation of computer processes of a network, operable to execute the stored programming code, that when executed causes the triage processing component to perform functions to:
populate a risk assessment matrix with a break risk assessment value and a fix risk assessment value both assigned to one or more corrective actions identified as being able to correct a possible cause of a potential operational breakdown of a computer process;
identify interdependency risk patterns in the risk assessment matrix populated with the break risk assessment value and the fix risk assessment value;
obtain, from a runbook, a list of corrective actions correlated to a first process break flag, wherein the runbook includes a plurality of corrective actions that correct potential operational breakdowns of the computer process of the network and the first process break flag indicating a symptom of the potential operational breakdown of the computer process; and generate, based on the identified interdependency risk patterns, a response strategy incorporating at least one corrective action from the list of corrective actions.

2. The apparatus of claim 1, wherein the identified interdependency risk patterns indicate risks related to each corrective action in the runbook and an effect of applying each corrective action on the computer process in the network.

3. The apparatus of claim 1, wherein the memory further comprises programming code that causes the triage processing component to perform further functions to:
assign the break risk assessment value indicating a likelihood of occurrence of the potential operational breakdown of the computer process in the network; and
assign a respective fix risk assessment value to each of the identified one or more corrective actions.

4. The apparatus of claim 3, wherein:
the assigned break risk assessment value has a range from a value indicating the potential operational breakdown has a high likelihood of occurring to another value indicating the potential operation breakdown has a low likelihood of occurring; and
the respective fix risk assessment value assigned to each of the identified corrective actions has a range from a value indicating the potential operational breakdown has a high likelihood of being fixed to a different value indicating the potential operation breakdown has a low likelihood of being fixed by the respective identified corrective action.

5. The apparatus of claim 1, wherein the memory further comprises programming code that causes the triage processing component to perform further functions to:
assign an interdependency rating to each corrective action in the list of corrective actions, wherein the interdependency rating quantifies a level of interdependence of the computer process on other computer processes potentially affected by application of each of the one or more corrective action in the list of corrective actions;
populate the risk assessment matrix with the assigned interdependency rating of each corrective action in the list of corrective actions; and
evaluate the risk assessment matrix, based on the assigned interdependency rating of each corrective action in the list of corrective actions to one another.

6. The apparatus of claim 1, wherein the memory further comprises programming code that causes the triage processing component to perform further functions to:
in response to an evaluation of the risk assessment matrix, flag a respective corrective action from the list of corrective actions as an optimal corrective action for use in the response strategy.

7. The apparatus of claim 6, wherein the memory further comprises programming code that causes the triage processing component to perform further functions to:
apply the flagged respective corrective action to the computer process experiencing a process fault associated with a computer process break flag in the network.

8. The apparatus of claim 1, wherein the memory further comprises programming code that causes the triage processing component to perform further functions to:
receive successive process break flags that follow previous process break flags from a monitoring circuit coupled to the triage processing component;
generate, based on the process break flags, break risk assessment values and fix risk assessment values of the process break flags;
populate a copy of the risk assessment matrix using the generated break risk assessment values and the generated fix risk assessment values to produce a revised risk assessment matrix;
analyze the break risk assessment values and the fix risk assessment values of the previous process break flags in the populated risk assessment matrix with reference to the break risk assessment values and the fix risk assessment values of the successive process break flags in the revised risk assessment matrix; and
update, based on results of the analysis of the break risk assessment values and the fix risk assessment values, the runbook to identify one corrective action in the list of corrective actions for implementing the one corrective action to fix the potential operational breakdown.

9. A method, comprising:
populating, by a triage processing component coupled to a plurality of monitoring circuits and a network environment, a risk assessment matrix with a break risk assessment value and a fix risk assessment value assigned to one or more corrective actions identified to correct a possible cause of a potential operational breakdown of a computer process;
identifying interdependency risk patterns in the risk assessment matrix populated with the assigned break risk assessment value and the fix risk assessment value assigned for each of the one or more identified corrective actions;
obtaining a list of corrective actions correlated to a first process break flag from a runbook, wherein the runbook includes a plurality of corrective actions that correct potential operational breakdowns of the computer process; and
generating, based on the identified interdependency risk patterns, a response strategy incorporating at least one corrective action from the list of corrective actions.

10. The method of claim 9, further comprising:
applying the at least one corrective action in the response strategy to the computer process experiencing a process fault associated with a computer process break flag in the network environment.

11. The method of claim 9, wherein the identified interdependency risk patterns indicate risks related to each corrective action in the runbook and an effect of applying each corrective action on the computer process in the network.

12. The method of claim 9, further comprising:
assigning, by the triage component, the break risk assessment value indicating a likelihood of occurrence of the potential operational breakdown of the computer process;
assigning a respective fix risk assessment value to each of the identified corrective actions; and
populating the risk assessment matrix with the assigned break risk assessment value of the computer process to each of the identified corrective actions and the assigned fix risk assessment value to each of the identified corrective actions.

13. The method of claim 9, wherein:
the assigned break risk assessment value has a range from a value indicating the potential operational breakdown has a high likelihood of occurring to another value indicating the potential operation breakdown has a low likelihood of occurring; and
the respective fix risk assessment value assigned to each of the identified corrective actions has a range from a value indicating the potential operational breakdown has a high likelihood of being fixed to a different value indicating the potential operation breakdown has a low likelihood of being fixed by a respective identified corrective action.

14. The method of claim 9, further comprising:
assigning an interdependency rating to each corrective action in the list of corrective actions, wherein the interdependency rating quantifies a level of interdependence of each of the computer processes potentially affected by application of each corrective action in the list of corrective actions;
populating the risk assessment matrix with the assigned interdependency rating of each corrective action in the list of corrective actions;
evaluating the risk assessment matrix, based on the assigned interdependency rating of each corrective action in the list of corrective actions to one another; and
in response to the evaluation of the risk assessment matrix, flagging a respective corrective action from the list of corrective actions as an optimal corrective action.

15. The method of claim 14, wherein the interdependency rating assigned to each corrective action quantifies a level of interdependence of each respective individual computer process affected by an application of each of corrective action in the list of corrective actions.

16. A non-transitory computer-readable storage medium storing computer-readable program code executable by a processor, wherein execution of the computer-readable program code causes the processor to:
populate by a triage processing component coupled to a plurality of monitoring circuits and a network environment, a risk assessment matrix with a break risk assessment value and a fix risk assessment value assigned to one or more corrective actions identified to correct a possible cause of a potential operational breakdown of a computer process;
identify interdependency risk patterns in the risk assessment matrix populated with the assigned break risk assessment value and the fix risk assessment value assigned for each of the identified corrective actions;
obtain a list of corrective actions correlated to a first process break flag from a runbook, wherein the runbook includes a plurality of corrective actions that correct potential operational breakdowns of computer implemented processes of the network; and
generate, based on the identified interdependency risk patterns, a response strategy incorporating at least one corrective action from the list of corrective actions.

17. The non-transitory computer-readable storage medium of claim 16, wherein:
apply the response strategy to a respective individual computer process experiencing a process fault associated with the first process break flag in the network environment.

18. The non-transitory computer-readable storage medium of claim 16, further comprising: computer-readable program code that when executed causes the processor to:
assign, by the triage component, the break risk assessment value indicating a likelihood of occurrence of the potential operational breakdown of the computer process; and
assign a respective fix risk assessment value to each of the identified corrective actions.

19. The non-transitory computer-readable storage medium of claim 18, wherein the identified interdependency risk patterns indicate risks related to each corrective action in the runbook and an effect of applying each corrective on the computer process in the network.

20. The non-transitory computer-readable storage medium of claim 16, further comprising computer-readable program code that when executed causes the processor to:
assign an interdependency rating to each corrective action in the list of corrective actions, wherein the interdependency rating quantifies a level of interdependence of each of the computer processes potentially affected by application of each corrective action in the list of corrective actions;
populate the risk assessment matrix with the assigned interdependency rating of each corrective action in the list of corrective actions;
evaluate the risk assessment matrix, based on the assigned interdependency rating of each corrective action in the list of corrective actions to one another; and
in response to the evaluation of the risk assessment matrix, flag a respective corrective action from the list of corrective actions as an optimal corrective action for use in the response strategy.

* * * * *